United States Patent [19]

Hatano

[11] Patent Number: 5,512,960
[45] Date of Patent: Apr. 30, 1996

[54] ADAPTIVE TYPE COLOR DEMODULATION APPARATUS FOR PAL SYSTEM

[75] Inventor: Takahisa Hatano, Sapporo, Japan

[73] Assignee: Mitsushita Electric Industrial Co., Ltd., Osaka, Japan

[21] Appl. No.: 414,440

[22] Filed: Mar. 31, 1995

[30] Foreign Application Priority Data

Mar. 31, 1994 [JP] Japan ..................... 6-061916

[51] Int. Cl.⁶ ..................................... H04N 9/66
[52] U.S. Cl. ............................. 348/640; 348/638
[58] Field of Search ..................... 348/638, 640, 348/649, 654, 727; 358/23; H04N 9/66, 5/455

[56] References Cited

U.S. PATENT DOCUMENTS 5,440,349  8/1995  Ban ......................... 348/638

FOREIGN PATENT DOCUMENTS 3182188  8/1991  Japan .

*Primary Examiner*—James J. Groody
*Assistant Examiner*—Sherrie Hsia
*Attorney, Agent, or Firm*—Ratner & Prestia

[57] ABSTRACT

An adaptive type color demodulation apparatus for the PAL system includes a first color demodulating circuit (PAL-D) for demodulating a PAL system chrominance signal between scanning lines and a second color demodulating circuit (PAL-S) for demodulating the PAL system chrominance signal on a scanning line. Also included is a vertical correlation detecting circuit for detecting a vertical correlation between chrominance signals which are separated by two horizontal periods and a selector for selecting either an output of the first color demodulating circuit or an output of the second color demodulating circuit in response to the detected result of the correlation detecting circuit. Accordingly, hue distortion of the chrominance signal which occurs during signal transmission is cancelled even if the phase distortion is large and a precise color signal is demodulated even if there is no correlation between adjacent scanning lines.

14 Claims, 5 Drawing Sheets

ADAPTIVE TYPE COLOR DEMODULATION APPARATUS FOR PAL SYSTEM

FIELD OF THE INVENTION

The present invention relates to an adaptive type color demodulation apparatus which demodulates two kinds of color difference signals from a PAL system chrominance signal.

BACKGROUND OF THE INVENTION

In the PAL system, the hue error caused by transmission distortion can be cancelled. An (R-Y) signal, one of the two kinds of color difference signals, is transmitted so that the phase of the (R-Y) is inverted every scanning line. A demodulator is used to cancel hue error of the chrominance signal by demodulating the chrominance signal using an operation between scanning lines at the receiver side. In this color demodulator, a 1H delay device is used for the demodulation operation between scanning lines. Here, 1H is one horizontal period. In another type of color demodulator, no delay device is used and color signals are demodulated at each scanning line as in the NTSC system. Hue error between adjacent scanning lines is cancelled by an integral effect of the viewer's eyes.

A block diagram of a prior art color demodulation apparatus for the PAL system using a delay device is shown in FIG. 1.

An input chrominance signal is delayed by 1H at a 1H delay device 203. The input chrominance signal and the 1H delayed chrominance signal are added at a first adder 205. In the PAL system, because the phase of the (R-Y) signal component is inverted every scanning line, the modulated (R-Y) signal components on adjacent scanning lines are cancelled with each other at the first adder 205 and only a (B-Y) signal component is outputted. The chrominance signal is phase inverted at a phase inverting circuit 204 and is added to the 1H delayed chrominance signal at a second adder 206. At the second adder 206, the (B-Y) signal components on the adjacent scanning lines are cancelled with each other and only an (R-Y) signal component is outputted.

A subcarrier generator 202 generates a subcarrier signal (4.43MHz) synchronized with a burst signal included in the input composite color television signal. The subcarrier signal is phase shifted by 90 degrees at a phase shift circuit 207 and is inputted to a (B-Y) demodulator 209 together with a modulated (B-Y) signal from the first adder 205 to produce the (B-Y) signal.

The subcarrier signal is inverted every scanning line at a line switching circuit 208. In the PAL system, the burst signal alternates its phase by +135 degrees and −135 degrees against the reference axis (B-Y) every scanning line. A line alternating signal is generated, based on the compared result between the phases of a burst signal and the subcarrier signal. At the line switching circuit 208, the subcarrier signal is phase shifted by 180 degrees every scanning line, synchronous with the line alternating signal.

The output of the line switching circuit 208 is inputted to an (R-Y) demodulator 210 together with the modulated (R-Y) signal which is output from the second adder 206 to produce an (R-Y) signal. This color demodulation method can cancel the phase distortion of the chrominance signal which occurs during transmission using an operation between scanning lines.

This color demodulation method is called PAL-D.

A block diagram of another prior art type color demodulation apparatus for the PAL system, in which a delay device is not used, is shown in FIG. 2. A subcarrier generator 302, a phase shift circuit 303, a line switching circuit 304, a (B-Y) demodulator 305, and an (R-Y) modulator 306 operate similarly to the blocks having the same names, and identified by reference numerals 202, 207, 208, 209, and 210 in FIG. 1, respectively.

This color demodulation method does not use a 1H delay device and can cancel a hue error between two signals on adjacent scanning lines utilizing an integral effect of the viewer's eyes. This color demodulation method is called PAL-S.

A color demodulation apparatus using a delay device has a problem. If there is no correlation between the signals on adjacent scanning lines, correct color demodulation does not occur because correlation of the phase distortion is performed between adjacent scanning lines. The color demodulation apparatus not using the delay device has a problem in that when phase error increase, venetian blind interference appears on the screen.

SUMMARY OF THE INVENTION

The present invention relates to an adaptive type color demodulation apparatus for the PAL system. The adaptive color demodulation apparatus includes a first color demodulator for demodulating a PAL chrominance signal between adjacent scanning lines, that is a PAL-D color demodulator. Also included is a second color demodulator for demodulating the PAL chrominance signal every scanning line, that is PAL-S color demodulator. Further included is a vertical correlation detector which detects a vertical correlation between signals on the adjacent scanning lines and a selector for selecting the output of either of the color demodulator according to the detected result of the vertical correlation detector.

The present invention further relates to an adaptive type color demodulation apparatus for the PAL system where hue distortion of the chrominance signal which occurs during transmission is cancelled even if the phase distortion is large. In addition, the chrominance signal can be demodulated with high accuracy even if there is no correlation between signals on the adjacent scanning lines.

DETAILED DESCRIPTION OF THE INVENTION

First exemplary embodiment

Figure 3:
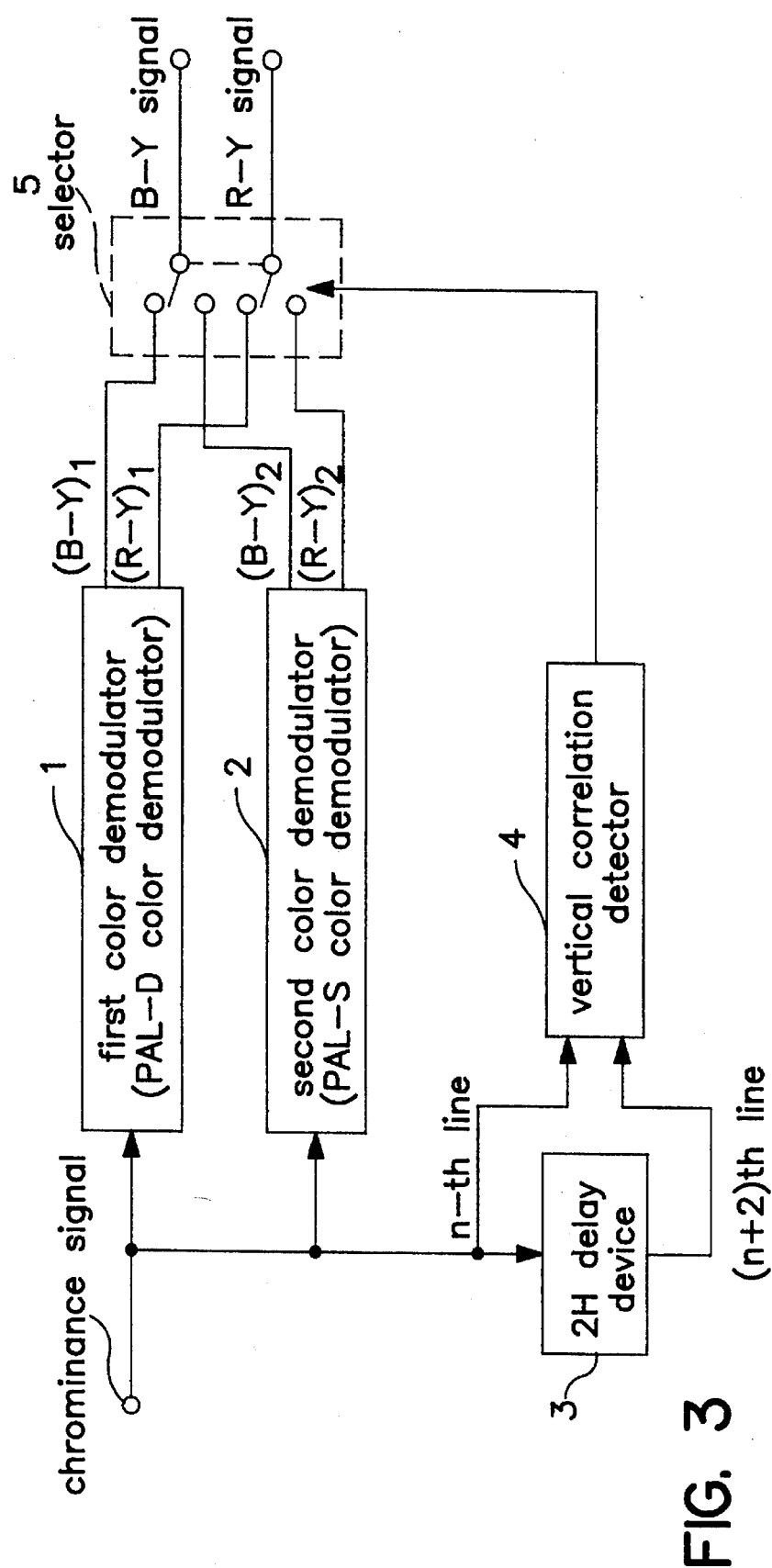
FIG. 3 is a block diagram of an adaptive type color demodulation apparatus for the PAL system in accordance with a first exemplary embodiment of the present invention.

A block diagram of an adaptive type color demodulation apparatus for the PAL system in accordance with a first exemplary embodiment of the present invention is shown in FIG. 3.

Figure 1:
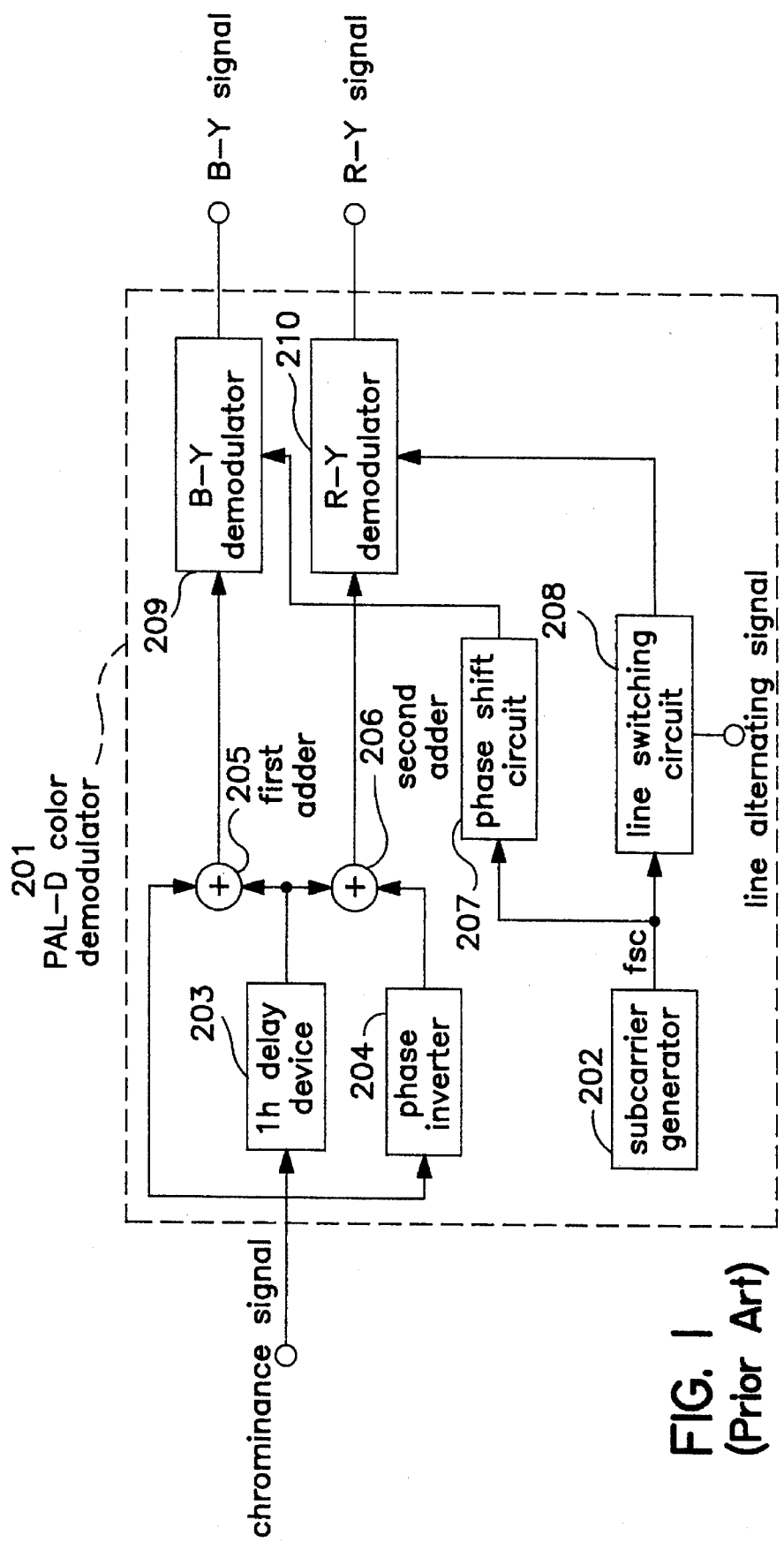
FIG. 1 is a block diagram of a color demodulation apparatus for the PAL system, in which a delay device is used, in accordance with the prior art.

A first color demodulator 1 is the same as the block diagram shown in FIG. 1 having a 1H delay device. The first color demodulator 1 is a PAL-D color demodulator. An input PAL chrominance signal is demodulated at the first color demodulator 1 and two kinds of color difference signals, (B-Y) 1 and (R-Y) 1 are produced by the first color demodulator 1. According to the method using the 1H delay device, the hue distortion of the color difference signals resulting during signal transmission is cancelled.

Figure 2:
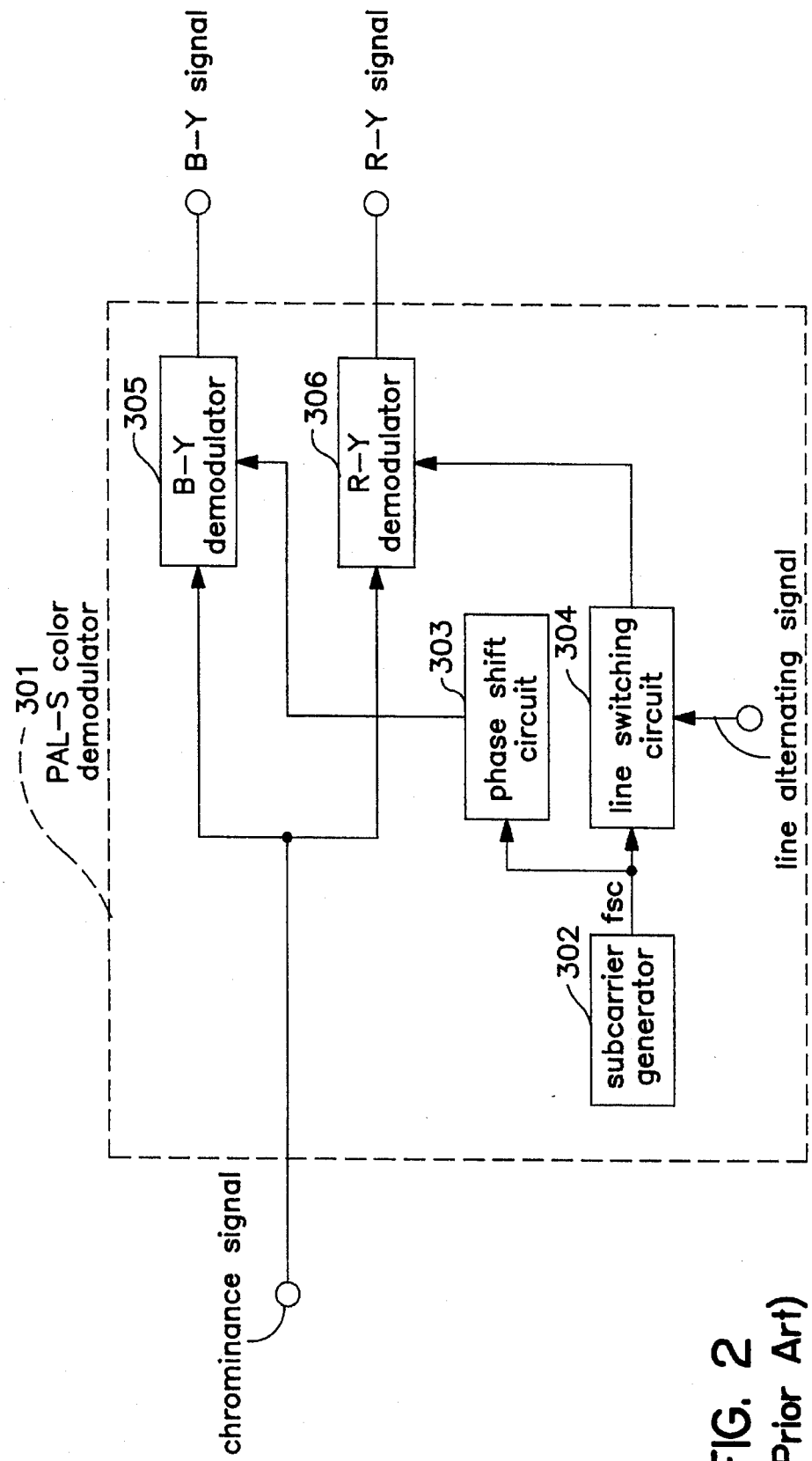
FIG. 2 is a block diagram of another color demodulation apparatus for the PAL system, in which no delay device is used, in accordance with the prior art.

A second color demodulator 2 is the same as a block diagram shown in FIG. 2 having no delay device. The second color demodulator 2 is a PAL-S color demodulator. The input PAL chrominance signal is demodulated at the second color demodulator 2 and two kinds of color difference signals, (B-Y) 2 and (R-Y) 2 are produced by the second color demodulator 2. Further, the input PAL chrominance signal is delayed by 2H periods at a 2H delay device 3 and a vertical correlation between two chrominance signals which are separated by 2H periods is outputted from a vertical correlation detector 4.

Figure 5:
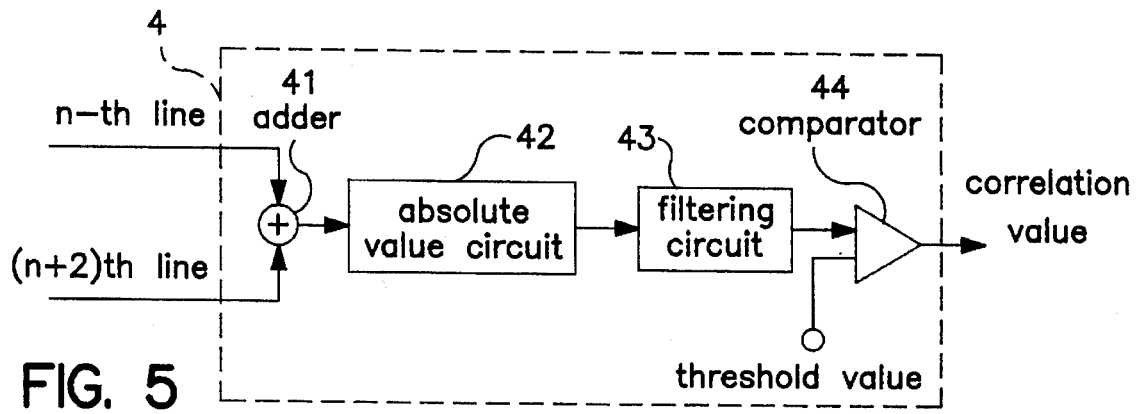
FIG. 5 is a block diagram of a vertical correlation detector used in an adaptive type color demodulation apparatus for the PAL system in accordance with the first exemplary embodiment of the present invention.

A block diagram of the vertical correlation detector 4 is shown in FIG. 5. A vertical correlation is obtained based on the phase of the chrominance signal which inverts every 2H periods. The chrominance signals which are apart by 2H periods and are signals on the n-th scanning line and on the (n+2)th scanning line are added at an adder 41.

An original chrominance signal on the n-th scanning line and another chrominance signal delayed by 2H periods from the original luminance signal on the (n+2)th scanning line are added at an adder 41. The output signal of the adder 41 is converted to an absolute value at an absolute value circuit 42 and then, the absolute value is filtered at a filtering circuit 43. An average value is obtained at the output of the filtering circuit 43. The average value is compared with a designated threshold value at a comparator 44 and a correlation value is provided from the comparator 44 to the selector 5.

If there is a correlation between both signals, the added result is zero. If there is no correlation between both signals, the added result has a value.

Thus, a correlation or a lack of correlation can be detected using the added result. The above correlation detection is possible because the chrominance signal inverts its polarity every two scanning lines. When the signals do not have a correlation, the color demodulation method using an 1H delay device can not correctly demodulate the signal and some interference appears on the screen. Therefore, if no correlation is detected, the selector 5 selects an output of the second color demodulator 2. If a correlation is detected, the selector 5 selects an output of the first color demodulator 1. Thus, better color difference signals, R-Y and B-Y are outputted from the selector 5.

Second exemplary embodiment

Figure 4:
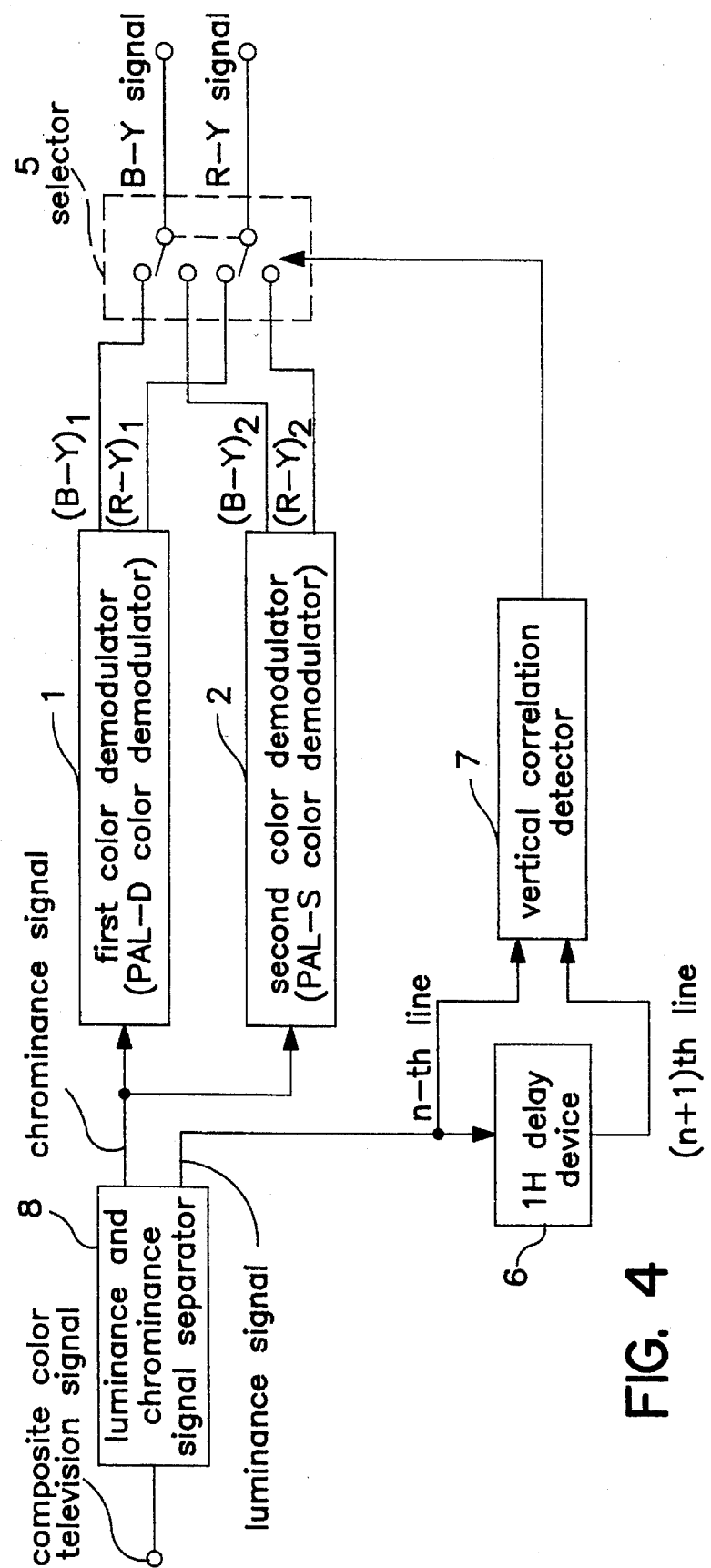
FIG. 4 is a block diagram of an adaptive type color demodulation apparatus for the PAL system in accordance with a second exemplary embodiment of the present invention.
Figure 6:
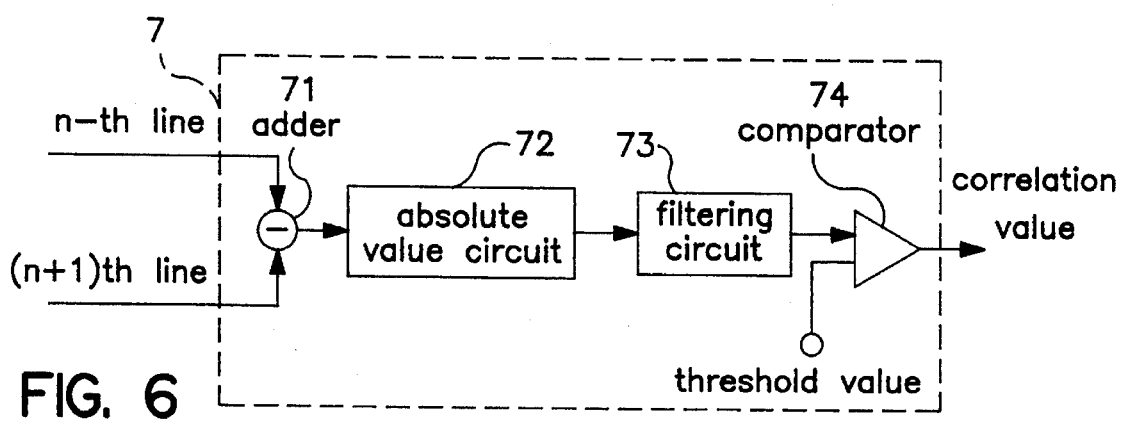
FIG. 6 is a block diagram of a vertical correlation detector used in an adaptive type color demodulation apparatus for the PAL system in accordance with the second exemplary embodiment of the present invention.

A block diagram of an adaptive type color demodulation apparatus for the PAL system in accordance with a second exemplary embodiment of the present invention is shown in FIG. 4. The first color demodulator 1 is the same as the block diagram shown in FIG. 1 having a 1H delay device. The first color demodulator 1 is a PAL-D color demodulator. The second color demodulator 2 is the same as the block diagram shown in FIG. 2 having no delay device, the second color demodulator 2 is a PAL-S color demodulator. A block diagram of the vertical correlation detecting circuit 7 is shown in FIG. 6.

A luminance signal separated from the input composite color television signal at a luminance and chrominance signal separator 8 is delayed by 1H period at a 1H delay device 6. An original luminance signal on the n-th scanning line and another luminance signal delayed by 1H period from the original luminance signal on the (n+1)th scanning line are added at an adder 71. The absolute value circuit 72, the filtering circuit 73 and the comparator 74 perform similarly to the absolute value circuit 42, the filtering circuit 43, and the comparator 44 explained in the first exemplary embodiment.

A first color demodulator 1, a second color demodulator 2 and a selector 5 perform as the same reference numerals in the first exemplary embodiment. In the second exemplary embodiment, a vertical correlation is obtained not from a chrominance signal but from a luminance signal. In addition, the two signals used to detect the correlation are not separated by 2H periods but by a 1H period. A correlation in the luminance signals is utilized in the second exemplary embodiment.

According to the first and second exemplary embodiments of the present invention, a color demodulation apparatus for the PAL system is provided in which the hue distortion of the chrominance signal which occurs during signal transmission is cancelled even if the phase distortion is large. In addition, a precise color signal is demodulated even if no correlation exists between adjacent scanning lines.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An adaptive type color demodulation apparatus for a PAL system transmission having a plurality of scanning lines, each of said scanning lines having a PAL system chrominance signal, said adaptive type color demodulation apparatus comprising:

first color demodulation means for demodulating the PAL system chrominance signal using at least two scanning lines of the plurality of scanning lines and for producing a first output signal;

second color demodulation means for demodulating the PAL system chrominance signal from at least one of the plurality of scanning lines to produce a second output signal;

vertical correlation detecting means for detecting a vertical correlation between two PAL system chrominance signals separated by two horizontal periods to produce a detected result; and selecting means for selecting one of the first output signal of said first color demodulation means and the second output signal of said second color demodulation means in response to the detected result of said vertical correlation detecting means.

2. An adaptive type color demodulation apparatus for a PAL system transmission having a plurality of scanning lines, each one of said scanning lines having a luminance signal and a PAL system chrominance signal, said adaptive type color demodulation apparatus comprising:

first color demodulation means for demodulating the PAL system chrominance signal using at least two scanning lines of the plurality of scanning lines to produce a first output signal;

second color demodulation means for demodulating said PAL system chrominance signal from at least one of the plurality of scanning lines to produce a second output signal;

vertical correlation detecting means for detecting a vertical correlation between a first luminance signal of a first scanning line from the plurality of scanning lines and a second luminance signal from a second scanning line of the plurality of scanning lines to be demodulated at said first color demodulation means to produce a detected result; and selecting means for selecting one of the first output signal of said first color demodulation means and said second output signal of said second color demodulation means in response to the detected result of said vertical correlation detecting means.

3. The adaptive type color demodulation apparatus as recited in claim 1, wherein the first color demodulation means is a PAL-D color demodulator.

4. The adaptive type color demodulation apparatus as recited in claim 1, wherein the second color demodulation means is a PAL-S color demodulator.

5. The adaptive type color demodulation apparatus as recited in claim 2, wherein the first color demodulation means is a PAL-D color demodulator.

6. The adaptive type color demodulation apparatus as recited in claim 2, wherein the second color demodulation means is a PAL-S color demodulator.

7. The adaptive type color demodulation apparatus as recited in claim 1, wherein said vertical correlation detection means comprises:

means for adding a previous scanning line with a subsequent scanning line to produce an added scanning line output; and means for comparing said added scanning line output to a threshold value to produce the detected result.

8. The adaptive type color demodulation apparatus as recited in claim 2, wherein the vertical correlation detection means comprises:

means for subtracting a subsequent luminance signal from a previous luminance signal to produce a subtracted luminance signal; and means for comparing the subtracted luminance signal to a threshold value to produce the detected result.

9. The adaptive type color demodulation apparatus as recited in claim 1, wherein the at least two scanning lines are adjacent to each other.

10. The adaptive type color demodulation apparatus as recited in claim 2, wherein the at least two. scanning lines are adjacent to each other.

11. The adaptive type color demodulation apparatus as recited in claim 1, wherein the second color demodulation means demodulates said PAL system chrominance signal from only one of the plurality of scanning lines to produce the second output signal.

12. The adaptive type color demodulation apparatus as recited in claim 2, wherein the second color demodulation means demodulates said PAL system chrominance signal from only one of the plurality of scanning lines to produce the second output signal.

13. A method for demodulating a PAL system transmission having a plurality of scanning lines, each of said plurality of scanning lines having a PAL system chrominance signal, said method comprising the steps of:

demodulating the PAL system chrominance signal using at least two scanning lines of the plurality of scanning lines and for producing a first output signal;

demodulating the PAL system chrominance signal from at least one of the plurality of scanning lines to produce a second output signal;

detecting a vertical correlation between two PAL system chrominance signals separated by two horizontal periods to produce a detected result; and selecting one of the first output signal and the second output signal in response to the detected result.

14. A method for demodulating a PAL system transmission having a plurality of scanning lines, each one of said scanning lines having a luminance signal and a PAL system chrominance signal, the method comprising the steps of:

demodulating the PAL system chrominance signal using at least two scanning lines of the plurality of scanning lines to produce a first output signal;

demodulating the PAL system chrominance signal from at least one of the plurality of scanning lines to produce a second output signal;

detecting a vertical correlation between a first luminance signal of a first scanning line from the plurality of scanning lines and a second luminance signal from a second scanning line of the plurality of scanning lines to produce a detected result; and selecting one of the first output signal and said second output signal in response to the detected result.

* * * * *